United States Patent

Broussaud et al.

[15] 3,638,494
[45] Feb. 1, 1972

[54] RADIOMETER SYSTEMS

[72] Inventors: Georges Broussaud; Claude Tinet, both of Paris, France

[73] Assignee: Thomson-CSF

[22] Filed: June 3, 1969

[21] Appl. No.: 829,995

[30] Foreign Application Priority Data

June 20, 1968 France....................................155733

[52] U.S. Cl........................................73/355 R, 343/100 ME
[51] Int. Cl...........................................G01j 5/00, G01r 23/00
[58] Field of Search................73/355, 355 EM; 343/100 ME

[56] References Cited

UNITED STATES PATENTS

| | | | |
|---|---|---|---|
| 3,017,505 | 1/1962 | Clapp | 343/100 ME |
| 3,028,596 | 4/1962 | McGillem et al. | 73/355 X |
| 3,056,958 | 10/1962 | Anderson | 343/100 ME |
| 3,446,074 | 5/1969 | Thomas | 73/355 |

*Primary Examiner*—Louis R Prince
*Assistant Examiner*—Frederick Shoon
*Attorney*—Cushman, Darby & Cushman

[57] ABSTRACT

A radiometer system comprising two filters, for respectively selecting two adjacent spectrum portions of the signals respectively radiated by the source whose temperature is to be measured and by a reference source, and two other filters for separating said spectrum portions after amplification in a single amplifier. The corresponding energy fractions are then detected and applied to a differential comparator.

5 Claims, 5 Drawing Figures

RADIOMETER SYSTEMS

The present invention relates to comparison radiometers generally referred to as Dicke radiometers.

In radiometers of this type, the input is switched alternately between a source whose equivalent thermodynamic temperature is to be measured and a source of known reference temperature. These radiometers comprise a differential comparator device which makes it possible to provide a measurement of the unknown temperature.

However, such radiometers exhibit certain drawbacks. On the one hand, because of the very principle on which they operate, they experience a loss of sensitivity due to the fact that each of the two pieces of information to be compared is suppressed while the other is present. On the other hand, it is absolutely essential to employ a perfectly balanced demultiplexing system, and this is very difficult to realize in practice.

It is the object of the present invention to overcome these drawbacks.

According to the invention there is provided a comparison radiometer, for receiving the signal radiated by an emissive source and for measuring the equivalent thermodynamic temperature of said source, comprising: a reference source of known temperature; a first and second filter, respectively coupled to said emissive source and said reference source and having respective passbands for selecting substantially adjacent spectrum portions respectively of said reference and emissive sources, said portions having the same width; amplifying means having an input coupled to said first and second filters and an output, said amplifying means having a passband encompassing the passbands of said first and second filters; and third and a fourth filters, each coupled to said output for separating, in the signal supplied by said output, respectively the portions corresponding to said emissive source and to said reference source; first and second energy detector means, respectively coupled to said third and fourth filters; and comparator means having two inputs respectively connected to said first and second detector means.

For a better understanding of the invention and to shown how the same may be carried into effect, reference will be made to the drawings accompanying the ensuing description and in which:

FIG. 1 schematically illustrates a conventional radiometer;

Figure 1:
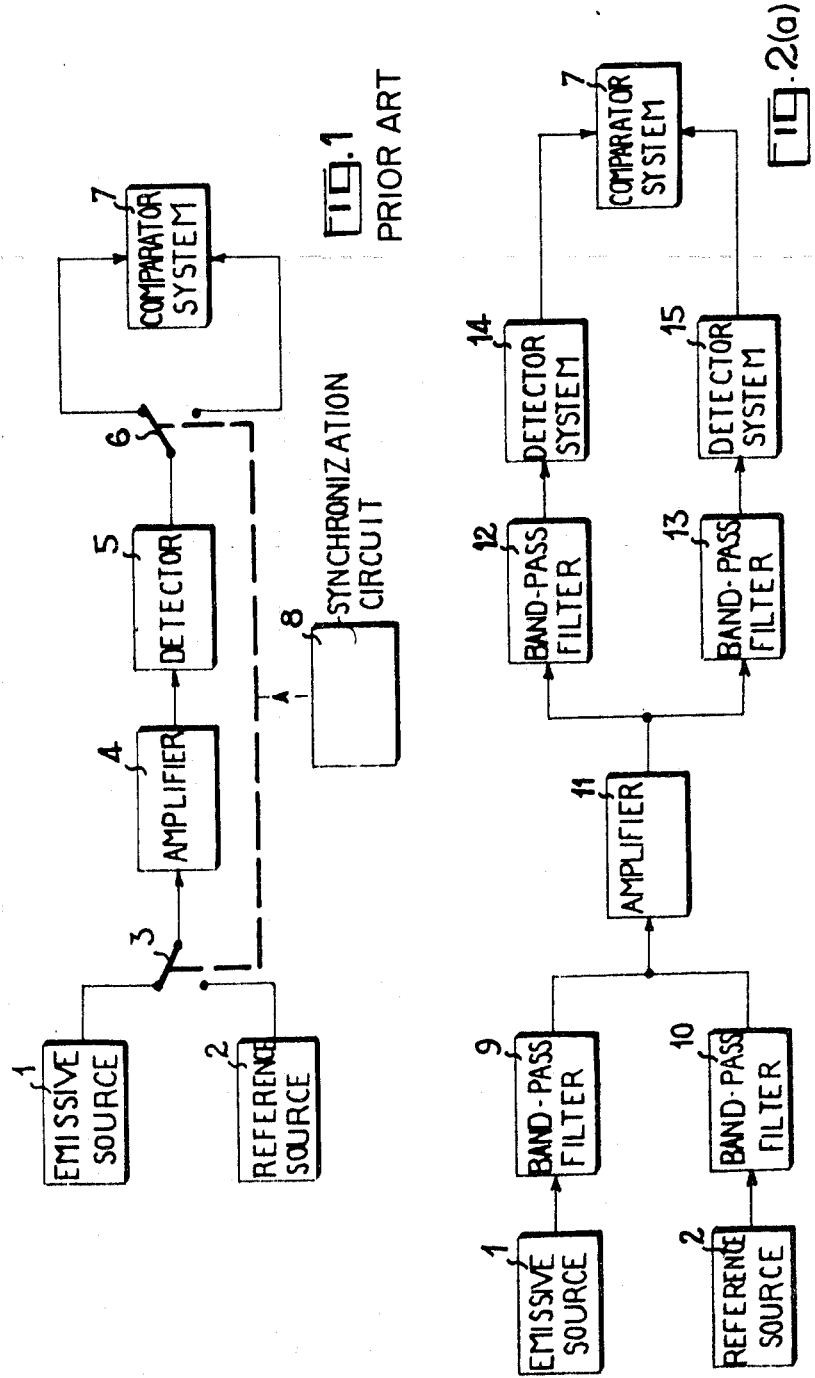

In FIG. 1, a conventional radiometer has been illustrated, by means of which the thermodynamic temperature $T_x$ of an emissive source 1 can be measured.

This radiometer comprises a reference source 2 of known temperature $T_c$, and a switching device 3 which makes it possible to connect alternatively one or the other of the sources 1 and 2 to the input of an amplifier system 4 having a wide passband B and a gain g. This amplifier system is followed by a detector system 5 and then by a demultiplexer 6 (here illustrated in the form of a mechanical switch), which makes it possible to supply to the two inputs of a differential comparator system 7, the signals corresponding respectively to the one and the other of the sources 1 and 2. The devices 3 and 6 are controlled in synchronism, this being schematically illustrated here by a circuit 8, in order to obtain adequate demultiplexing in the device 6.

The operation of a conventional radiometer of this kind is as follows:

When the source 1 is connected to the input of the amplifier system 4, and assuming that the detector system produces an output voltage proportional to the input power, the output signal from the detector system 5 supplies the voltage:

$$V_x = AgB(T_x + T_r),$$

where $A$ is a constant and $T_r$ is the equivalent noise temperature of the amplifier system.

Similarly, when the reference source 2 is connected to the input of the amplifier system 4, the output signal can be written as:

$$V_c = AgB(T_c + T_r).$$

If sufficiently fast switching is effected for the variations of $T_r$ and of $g$ to be virtually zero during the time of comparison of these two output voltages, then the comparator system 7 will produce a value:

$$V_x - V_c = AgB(T_x - T_c),$$

which is independent of the noise temperature $T_r$. If, moreover, the temperature $T_c$ is set in the vicinity of $T_x$, a zero measurement is effected which eliminates any influence on the part of variations in the gain $g$. It is clear, however, that in a conventional radiometer of this kind, the information emanating from one source is suppressed during the time in which information is being received from the other source, and this means a reduction in the inherent sensitivity of the switching system; also, the demultiplexing has to be perfectly balanced.

It is an object of the invention to eliminate this switching function and therefore the corresponding demultiplexing process.

Figure 2:
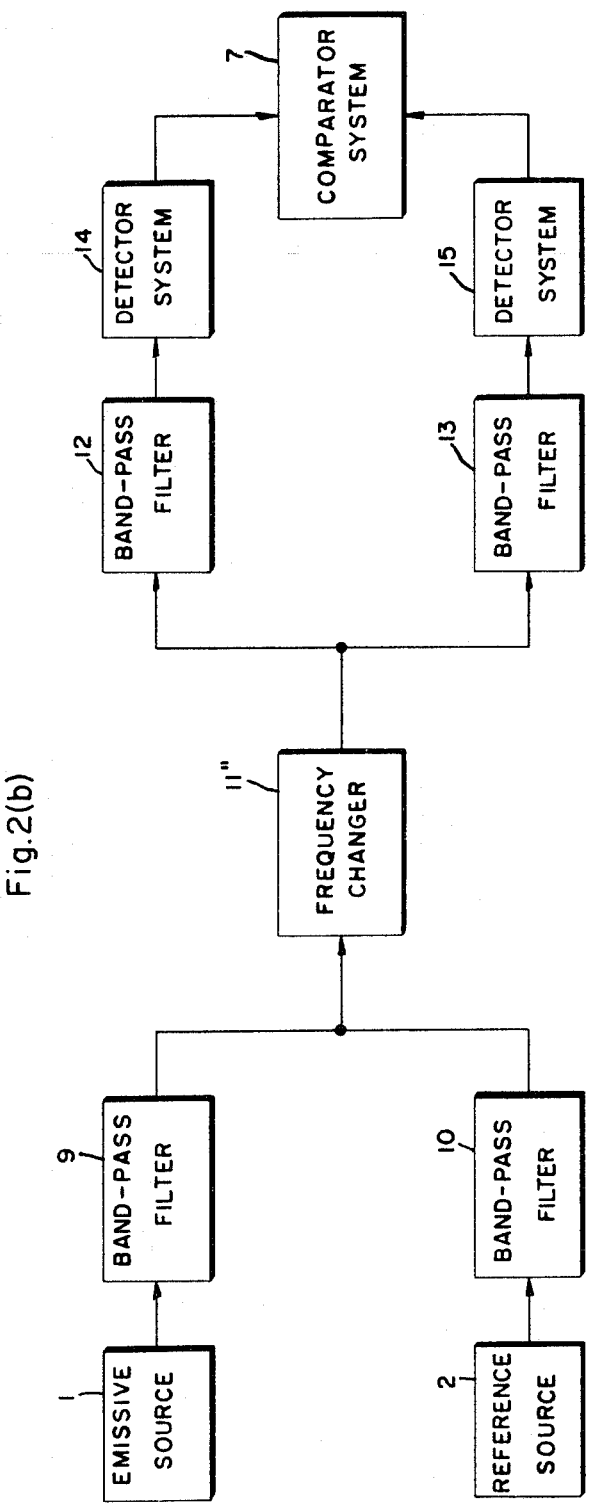
FIG. 2a shows a block diagram of a radiometer in accordance with the invention.
FIG. 2b shows a block diagram of a variant embodiment of the radiometer of the invention.

The radiometer according to the invention is illustrated in FIG. 2a. Similar reference numbers designate in this figure elements similar to those of FIG. 1.

Band-pass filters 9 and 10 are respectively connected to the sources 1 and 2 and respectively select adjacent bands of identical width. The output signals from these filters are fed together to an amplifier system 11 with a passband which encompasses the combined passbands of the two filters 9 and 10. At the output the signals produced from the two sources are separated by two filters 12 and 13, having characteristics identical to the filters 9 and 10 respectively.

Two matched energy detector systems 14 and 15, for example bolometers enable the received signals to be detected, and transmit corresponding detected signals to the differential comparator system 7.

Figure 3:
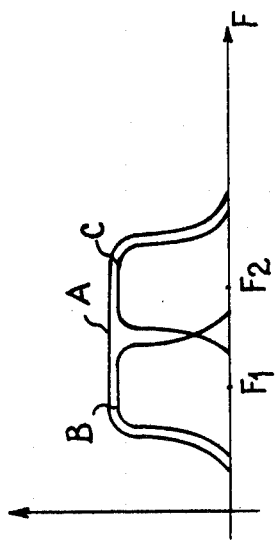
FIG. 3 shows explanatory curves.

The operation of the system will become apparent from a consideration of FIG. 3. The curves B and C shown in this figure respectively illustrate the passband of the filters 9 and 12 and that of the filters 10 and 13. These passbands have the same width but their respective band-center frequencies $F_1$ and $F_2$ are sufficiently spaced apart for the noise spectra generated by the sources 1 and 2 and passed by the amplifier 11 to have only a negligible common fraction. Assuming the equivalent thermodynamic temperature of the sources to be higher than 4° K., the noise powers of the sources 1 and 2 will have the same spectral distribution density in the spectrum portions corresponding to the passbands B and C.

These powers are amplified by the amplifier system 11 which has a passband, illustrated by the curve A in FIG. 3, sufficiently wide to encompass the respective passbands of the filters 9 and 10.

Of course, it is possible to employ a frequency-changer amplifier system 11'' as shown in the variant embodiment of FIG. 2b. In this case, the center frequency of the filters 12 and 13 will differ from those of the filters 9 and 10.

Because entirely passive filters are used, there is no risk of any random variation in the characteristics.

In order to prevent the introduction of errors, it is necessary for the two detectors 14 and 15 to be perfectly matched and to have stable characteristics. Bolometers are well suited to this application.

Figure 4:
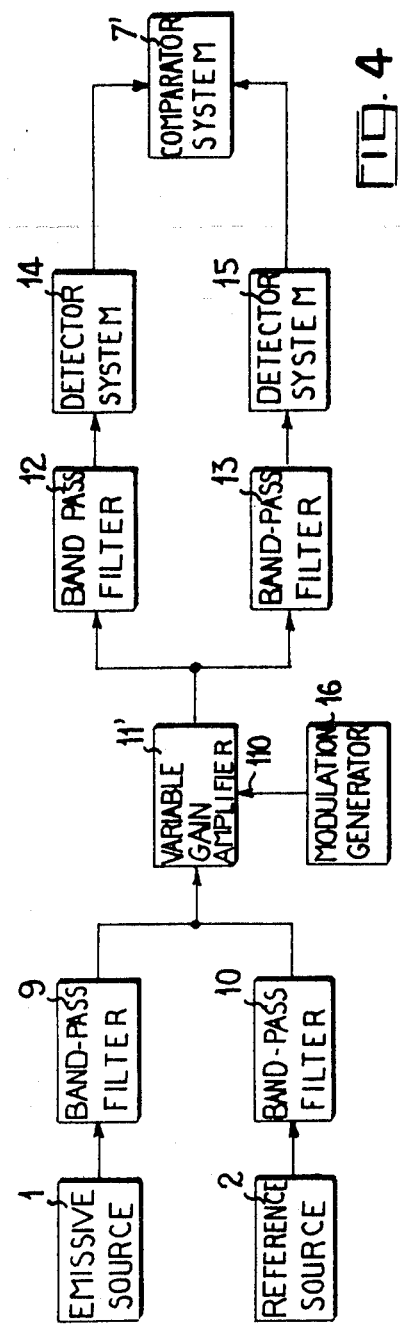
FIG. 4 is a diagram of another variant embodiment of the radiometer of the invention.

In FIG. 4, a variant embodiment of the radiometer of the invention has been illustrated. In order to achieve very high stability in the characteristics of the differential comparator system, a comparator system 7' which instead of continuous signals handles amplitude-modulated signals, is used.

For this purpose, a variable-gain amplifier system 11', controlled at the input 110, is used. This control input 110 is connected to a generator 16 producing modulating signals which, for example, can be a square wave generator.

Of course the invention is not limited to the embodiments described and shown which were given solely by way of example.

What is claimed is:

1. A comparison radiometer, for receiving the signal radiated by an emissive source and for measuring the equivalent thermodynamic temperature of said source, comprising: a reference source of known temperature; means for collecting the radiation from said emissive source; a first and a second filter, respectively coupled to said collecting means and said reference source and having respective passbands for selecting substantially adjacent spectrum portions respectively of said reference and emissive sources, said portions having the same bandwidth; amplifying means having an input coupled to said first and second filters and an output, said amplifying means having a passband encompassing the passbands of said first and second filters; a third and a fourth filters, each coupled to said output for separating, in the signal supplied by said output, respectively the portions corresponding to said emissive source and to said reference source; first and second energy detector means, respectively coupled to said third and fourth filters; and comparator means having two inputs respectively connected to said first and second detector means.

2. A radiometer as claimed in claim 1, wherein said amplifying means comprise an amplifier arrangement and wherein said third and fourth filters are identical respectively to said first and second filters.

3. A radiometer as claimed in claim 2, wherein said amplifier arrangement comprises a variable-gain amplifier having a gain control input and a modulation signal generator connected to said gain control input.

4. A radiometer for receiving the signal radiated by an emissive source and for measuring the equivalent thermodynamic temperature of said source, comprising; a reference source of known temperature; means for collecting the radiation from said emissive source; a first and a second filter, respectively coupled to said collecting means and said reference source and having respective passbands for selecting substantially adjacent spectrum portions respectively of said reference and emissive sources, said portions having the same bandwidth; amplifying means having an input coupled to said first and second filters and an output; said amplifying means having passband encompassing the passbands of said first and second filters; a third and a fourth filter, each coupled to said output for separating, in the signal supplied by said output, respectively the portions corresponding to said emissive source and to said reference source; first and second energy detector means, respectively coupled to said third and fourth filters; and comparator means having two inputs respectively connected to said first and second detector means said amplifying means comprising frequency changing means and an amplifier arrangement; said third and fourth filters having passbands with the same bandwidths respectively as said first and second filters and the respective center frequencies of said passbands offset by the same amount with respect to the center frequencies respectively of said first and second filters.

5. A radiometer as claimed in claim 4, wherein said amplifier arrangement comprises a variable-gain amplifier having a gain control input and a modulation signal generator connected to said gain control input.

* * * * *